United States Patent
Bollella et al.

(10) Patent No.: US 7,171,501 B2
(45) Date of Patent: Jan. 30, 2007

(54) SYSTEM AND METHOD FOR ASYNCHRONOUS TRANSFER OF CONTROL

(75) Inventors: Gregory Bollella, Palo Alto, CA (US); Benjamin M. Brosgol, Belmont, MA (US); Scott D. Robbins, Pittsburgh, PA (US); David S. Hardin, Cedar Rapids, IA (US); Peter Dibble, Bethel Park, PA (US)

(73) Assignee: Sun Microsystems, Inc., Santa Clara, CA (US)

( * ) Notice: Subject to any disclaimer, the term of this patent is extended or adjusted under 35 U.S.C. 154(b) by 723 days.

(21) Appl. No.: 10/279,168

(22) Filed: Oct. 23, 2002
(Under 37 CFR 1.47)

(65) Prior Publication Data
US 2003/0140086 A1 Jul. 24, 2003

Related U.S. Application Data

(60) Provisional application No. 60/348,105, filed on Oct. 23, 2001.

(51) Int. Cl.
*G06F 13/24* (2006.01)
(52) U.S. Cl. .................. 710/261; 710/260; 710/240
(58) Field of Classification Search ........ 710/260–266, 710/240–244; 717/159, 124, 1
See application file for complete search history.

(56) References Cited

U.S. PATENT DOCUMENTS

| | | | |
|---|---|---|---|
| 4,400,769 A | | 8/1983 | Kaneda et al. ............... 710/267 |
| 5,369,770 A | * | 11/1994 | Thomason et al. ......... 710/260 |
| 6,090,155 A | * | 7/2000 | Donovan et al. ........... 717/158 |
| 6,634,023 B1 | * | 10/2003 | Komatsu et al. ............ 717/159 |
| 6,651,163 B1 | * | 11/2003 | Kranich et al. ............. 712/244 |
| 6,826,748 B1 | * | 11/2004 | Hohensee et al. .......... 717/130 |

* cited by examiner

*Primary Examiner*—Rehana Perveen
*Assistant Examiner*—Kim T. Huynh
(74) *Attorney, Agent, or Firm*—Martine Penilla & Gencarella, LLP (57) ABSTRACT

An invention is provided for a synchronous transfer of control. An asynchronous interrupt exception is received, and in response, the value of a reference counter is determined. The value of the reference counter is based on the execution of synchronized code. Generally, the reference counter is initialized to a predetermined number, and altered based on the execution of synchronized code. When the asynchronous interrupt exception is received, the method is asynchronously interrupted when the value of the reference counter is equal to the predetermined number.

12 Claims, 7 Drawing Sheets

SYSTEM AND METHOD FOR ASYNCHRONOUS TRANSFER OF CONTROL

CROSS REFERENCE TO RELATED APPLICATIONS

This application claims the benefit of U.S. Provisional Patent Application No. 60/348,105, Oct. 23, 2001, entitled "System and Method for Asynchronous Transfer of Control," which is incorporated herein by reference.

BACKGROUND OF THE INVENTION

1. Field of the Invention

This invention relates generally to computer program flow and control, and more particularly to asynchronous transfer of control during real-time operation.

2. Description of the Related Art

Java, originally developed by Sun Microsystems, is an object-oriented, multi-threaded, portable, platform-independent, secure programming environment used to develop, test and maintain software programs. Java programs have found extensive use on the World Wide Web, which is the Internet's multimedia information retrieval system. These programs include full-featured interactive, standalone applications, as well as smaller programs, known as applets, that run in a Java-enabled Web browser or applet viewer.

Although Java works well for general programming, when interacting in real world environments, situations may occur that can cause a computer program to freeze or crash if not handled properly. For example, when a computer program performs a division with two numbers received from outside sources, such as from a user, a division by zero may occur if a zero is entered as the denominator. Since a division by zero is undefined, the computer program will crash if this operation is not handled properly. To assist Java programs in interacting with the real world, Java synchronous exceptions, which utilize a synchronous block construct, were developed.

Figure 1:
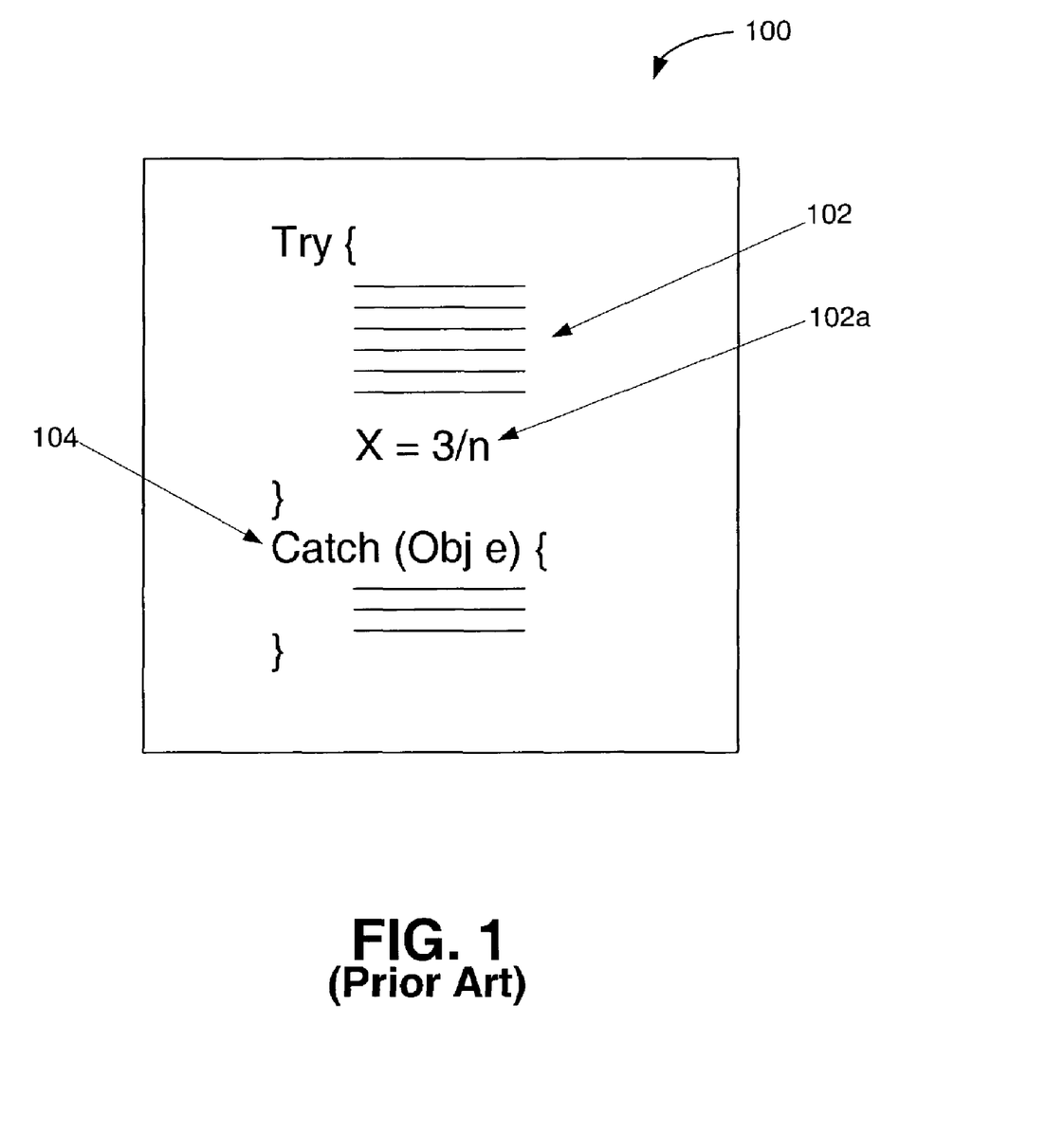
FIG. 1 is an exemplary conventional try-catch block.

FIG. 1 is an exemplary conventional try-catch block 100. The try-catch block 100 includes a main code area 102 providing the general logic of the function, and a catch clause 104 for handling synchronous exceptions that are raised. As shown in FIG. 1, the exemplary try-catch block 100 includes a divide operation 102a, which assigns a variable X the value of 3/n, where the value of n is determined elsewhere. During execution, a divide by zero exception can be thrown if the value of n is zero at the time operation 102a is executed. In this case, the main code area 102 will exit and execution will jump to the catch clause 104, which includes the computer instructions executed when a divide by zero exception is thrown. In this manner, a Java program is able to continue execution when a divide by zero occurs.

Although the conventional try-catch block 100 works well when the code of the computer program performs an operation that causes an exception to be thrown, real-time systems often require the ability to perform asynchronous transfers of control. The goal of real-time systems is to ensure that tasks or operations are completed with acceptable and predictable timeliness, including responding to events within an upper-bounded timeframe, and meeting the hard deadlines for any tasks. A priori predictability of completion timeliness is the essence of real-time computing.

In the real world, drastic and asynchronous changes can occur such that the current point of logic execution should be immediately and efficiently transferred to another location. Thus, real-time applications often require a mechanism that allows the application to programatically change the locus of control of another thread.

In view of the forgoing, there is a need for real-time methods that provide asynchronous transfer of control. The methods should allow threads to change the locus of control of another thread. Further, the methods should allow for deferred code areas that cannot be interrupted, such as during synchronized blocks where an interrupt could cause a monitored object to be left in an inconsistent state, violating the monitor invariant.

SUMMARY OF THE INVENTION

Broadly speaking, the present invention fills these needs by providing a mechanism for asynchronous transfer of control during real-time operation. In one embodiment, a process is disclosed for providing asynchronous transfer of control. An asynchronous interrupt exception is received, and a determination is made as to whether the method is currently executing synchronized code based on particular method calls. The method is then asynchronously interrupted when the method is executing non-synchronized code.

Another method for providing asynchronous transfer of control is disclosed in a further embodiment of the present invention. As above, an asynchronous interrupt exception is received. In response to the asynchronous interrupt exception, the value of a reference counter is determined. The value of the reference counter is based on the execution of synchronized code. Generally, the reference counter is initialized to a predetermined number, and the method is asynchronously interrupted in response to the asynchronous interrupt exception when the value of the reference counter is equal to the predetermined number.

In a further embodiment, a computer program embodied on a computer readable medium is disclosed that provides asynchronous transfer of control. The computer program includes a code segment for receiving an asynchronous interrupt exception, and a code segment for altering the value of a reference counter based on monitor method calls. In addition, a code segment is included that determines the value of the reference counter when the asynchronous interrupt exception is received. Also included is a code segment for asynchronously interrupting the method when the value of the reference counter is a predetermined number. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for asynchronous transfer of control during real-time operation. Embodiments of the present invention can defer asynchronous interruption of synchronized blocks using monitor calls as a basis for determining when the synchronized block is being executed. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

As mentioned above, in many cases, a real-time application needs to respond to events asynchronously in a way that may alter the sequence of control of a particular thread. One of the most frequent occurrences is the expiration of a watchdog timer, which can cause the current operation to abort. In other cases, an event may be used to notify the application of a significant condition that may require special handling such as shedding load in response to overload. The embodiments of the present invention provide a mechanism that allows the asynchronous transfer of control to allow applications to respond to events asynchronously to alter control of a particular thread.

Broadly speaking, embodiments of the present invention use a lexical scoping mechanism to mark regions of code that are interruptible. When an asynchronous event occurs that attempts to abort the current operation, the thread immediately exits any interruptible operation it is performing and continues to unwind through all stack frames that are interruptible, while still allowing non- interruptible operations to complete normally. This process uses a more orderly regression than simply destroying the thread or throwing an exception asynchronously in a section of code that does not expect it. For example, throwing an exception within a synchronized block could cause the monitored object to be left in an inconsistent state, violating the monitor invariant.

Hence, embodiments of the present invention provide a mechanism for asynchronous transfer of control that allows efficient and safe transfer of logic execution to another program location. As such, embodiments of the present invention are particularly useful for real-time programming using an object-oriented computer programming language, such as Java. However, it should be noted that other programming languages in addition to Java may be used to implement the embodiments of the present invention, including both procedural and object oriented programming languages. Object-oriented programming is a method of creating computer programs by combining certain fundamental building blocks, and creating relationships among and between the building blocks. The building blocks in object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction to the object to execute a certain method. It comprises a method selection (name) and a plurality of arguments that are sent to the object. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. A class defines a type of object that typically includes both instance variables and methods for the class. An object class is used to create a particular instance of an object. An instance of an object class includes the variables and methods defined for the class. Multiple instances of the same class can be created from an object class. Each instance that is created from an object class is said to be of the same type or class. A hierarchy of classes can be defined such that an object class definition has one or more subclasses. A subclass inherits its parent's (and grandparent's etc.) definition. Each subclass in the hierarchy may add to or modify the behavior specified by its parent class.

Figure 2:
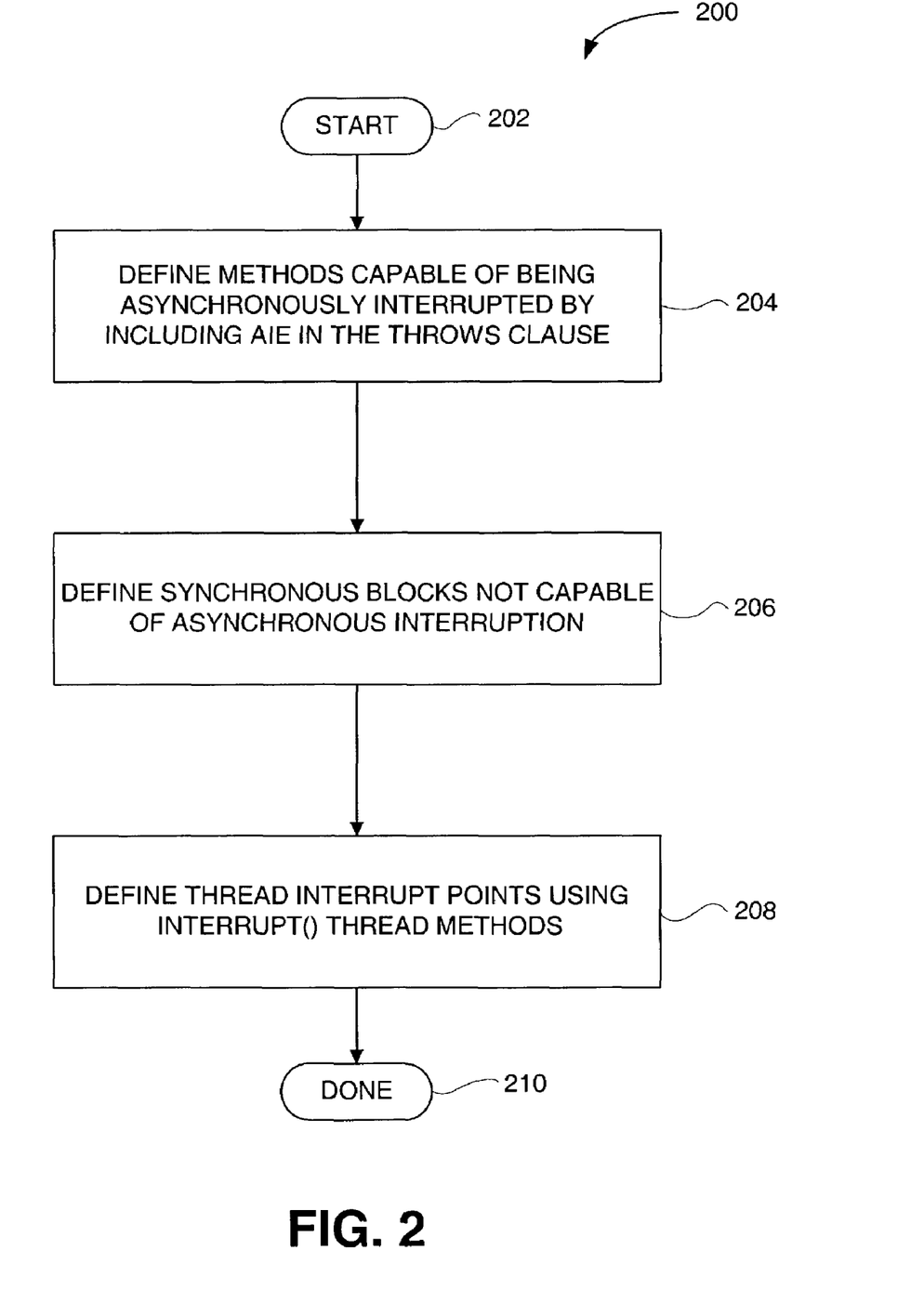
FIG. 2 is flowchart showing a process for providing asynchronous transfer of control, in accordance with an embodiment of the present invention.

With the above in mind, FIG. 2 is flowchart showing a process 200 for providing asynchronous transfer of control, in accordance with an embodiment of the present invention. In an initial operation 202, preprocess operations are performed. Preprocess operations can include asynchronous event definitions, thread definitions, and other preprocess operations that will be apparent to those skilled in the art after a careful reading of the present description.

In operation 204, methods capable of being asynchronously interrupted are defined by including an asynchronous interrupted exception (AIE) in the throws clause. The throws clause is part of a method's specification that lists exceptions the method may throw. Embodiments of the present invention utilize an AIE to indicate methods capable of being asynchronously interrupted. An AIE is an exception that is thrown in response to an attempt to asynchronously transfer the locus of control of a thread. The ability for one thread to trigger an asynchronous transfer of control in another thread is needed in many types of real-time applications. However, this ability should not come at the expense of problems such as data structure corruption and deadlock. There is a tension between the desire to cause an asynchronous transfer of control to be immediate and the desire to ensure that certain sections of code are executed to completion.

To balance this tension, one embodiment of the present invention allows asynchronous transfer of control in a method only if the method explicitly permits asynchronous transfer of control to occur. In this embodiment, the default is no asynchronous transfer of control to accommodate code not expecting asynchronous transfer of control. To indicate a method will allow asynchronous transfer of control, embodiments of the present invention place an AIE in the throws clause of the method.

Figure 3:
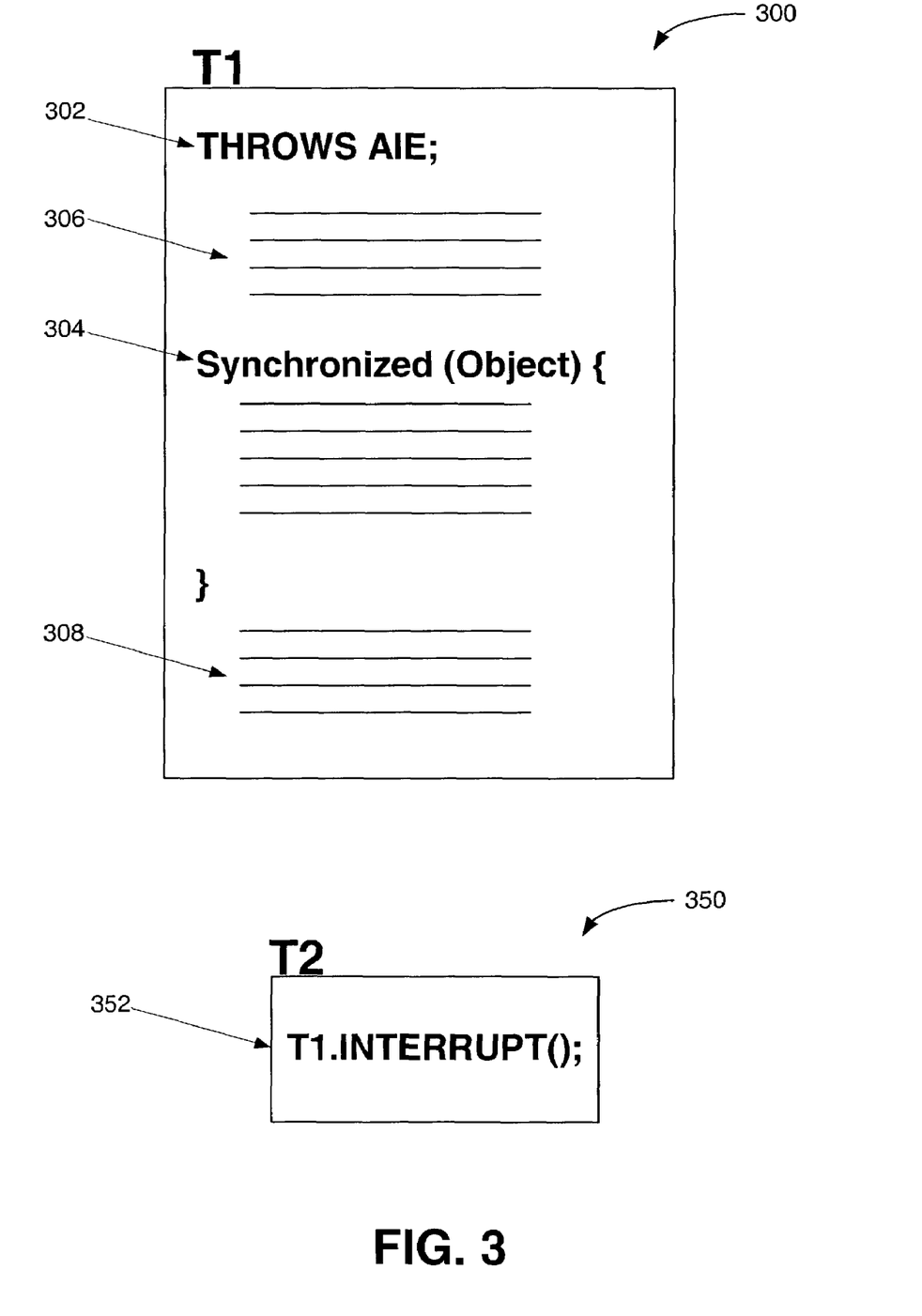
FIG. 3 is a diagram showing two real-time threads T1 and T2, in accordance with an embodiment of the present invention.

FIG. 3 is a diagram showing two real-time threads T1 300 and T2 350, in accordance with an embodiment of the present invention. The thread T1 300 includes a method with a throws clause 302, a synchronized block 304, and two non-synchronized code sections 306 and 308. As shown in FIG. 3, the thread T1 300 includes a method with an AIE in its throws clause 302, indicating thread T1 300 can be asynchronously interrupted. The throws AIE clause 302 is a marker on the stack frame that allows a method to be statically marked as asynchronously interruptible.

When a method is declared with an AIE in its throws clause 302, the method will terminate execution if interrupted by another thread while the method is executing, or if such an interrupt is pending any time control returns to the method. If control is in a synchronized block or in a non-AIE method when another thread attempts to interrupt it, the system will but an AIE into a pending state. Later, when control leaves the synchronized block or attempts to call, or return to, an AIE-method, the system throws the AIE and control is transferred to the nearest appropriate catch clause. In this manner, long-running computations can be terminated without the overhead or latency of polling.

Referring back to FIG. 2, synchronized blocks are defined that do not allow asynchronous transfer of control, in operation 206. One embodiment of the present invention defines synchronized blocks as asynchronous transfer of control deferred sections of code. Synchronized blocks serialize access to resources (or code) that must execute atomically with respect to multiple threads. Thus, two or more threads are permitted into a synchronized block only one at a time. Synchronized blocks need to be executed completely in order to ensure an application operates correctly, since a shared object could be left in an inconsistent state if synchronized code is aborted before completion. Thus, embodiments of the present invention treat synchronized blocks as uninterruptible code sections.

Referring back to FIG. 2, thread interrupt points are defined, in operation 208. Embodiments of the present invention utilize interrupt methods defined for a thread to asynchronously interrupt the control flow of a thread. In one embodiment, an .interrupt( ) method is used to asynchronously interrupt the control logic of a thread. For example, in FIG. 3, thread T2 350 includes an interrupt call 352, which is actually an .interrupt( ) method call for thread T1 300. When the interrupt call 352 is performed, and control for thread T1 is currently in code section 306, the AIE is propagated up the stack to an appropriate catch clause. However, if control is in the synchronized block 304 when the interrupt call 352 is performed, the AIE is made pending. Then, when control leaves the synchronized block 304 to code section 308, the AIE is activated and propagated up the stack to an appropriate catch clause. Finally, if control is in code section 308 when the interrupt call 352 is performed, the AIE is propagated up the stack to an appropriate catch clause, as discussed above with reference to code section 306.

Additionally, when the interrupt call 352 is performed, the AIE is compared against any currently pending AIE on the thread. If there is none, or if the depth of the AIE is less than the currently pending AIE, that is, the AIE is targeted at a less deeply nested method call, the AIE becomes the currently pending interrupt. Otherwise the AIE is discarded. Further, if the thread currently T1 is interruptible, the exception is thrown on the thread, otherwise, the exception remains pending until control returns to an interruptible method, at which point the AIE is thrown.

Figure 4:
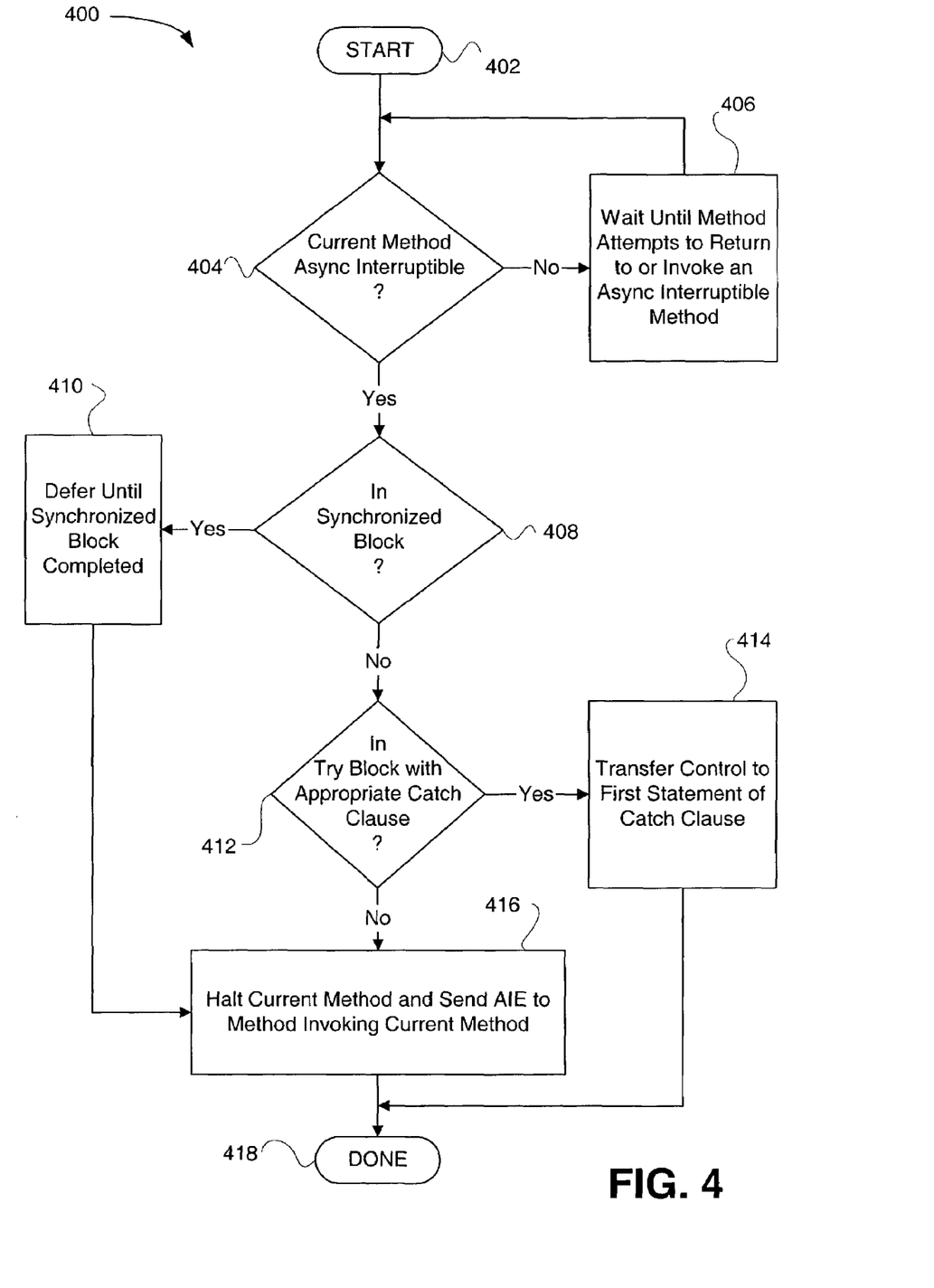
FIG. 4 is a flowchart showing a process for handling an AIE exception, in accordance with an embodiment of the present invention.

FIG. 4 is a flowchart showing a process 400 for handling an AIE exception, in accordance with an embodiment of the present invention. In an initial operation 402, preprocess operations are performed. Preprocess operations can include defining real-time threads, defining synchronized blocks, receiving an AIE, and other preprocess operations that will be apparent to those skilled in the art after a reading of the inventions set for in the present disclosure.

In operation 404, a decision is made as to whether the current method is asynchronously interruptible. As mentioned above, embodiments of the preset invention utilize an AIE to indicate methods capable of being asynchronously interrupted. An AIE is an exception that is thrown in response to an attempt to asynchronously transfer the locus of control of a thread, which is needed in many types of real-time applications. If the current method is asynchronously interruptible the process 400 continues to operation 408, otherwise the process 400 branches to operation 406.

In operation 406, the process 400 waits until the current method attempts to return to an asynchronously interruptible method or the current method attempts to invoke an asynchronously interruptible method. Operation 406 occurs in response to receiving an AIE while executing a method that is not asynchronously interruptible, indicated by omitting an AIE from the method's throws clause. As mentioned above, embodiments of the present invention default to no asynchronous transfer of control to provide for code not expecting asynchronous transfer of control. To indicate a method will allow asynchronous transfer of control, embodiments of the present invention place an AIE in the throws clause of the method.

In operation 408, a decision is made as to whether the method currently is executing a synchronized block. As mentioned previously, synchronized blocks need to be executed completely in order to ensure an application operates correctly, since a shared object could be left in an inconsistent state if synchronized code is aborted before completion. Thus, embodiments of the present invention handle synchronized blocks as uninterruptible code sections. As such, if the method currently is executing a synchronized block, the process 400 branches to operation 410, otherwise the process 400 continues with operation 412.

A decision is made as to whether the current method is executing within a try clause, in operation 412. A try clause can be utilized for both a synchronized block and to handle AIE exceptions. In the latter case, a catch clause can be used to handle the AIE in a manner similar to exception handling in a synchronized block. If the current method is executing within a try clause, the process 400 branches to operation 414. Otherwise, the process 400 continues with operation 416.

The AIE is deferred until the synchronized block completes execution, in operation 410. Since synchronized blocks need to be executed completely in order to ensure an application operates correctly, embodiments of the present invention do not interrupt execution of synchronized blocks upon receiving an AIE. Instead, embodiments of the present invention allow the synchronized blocks to continue execution. The AIE is then handled thereafter, as described in detail with reference to operation 416 below.

In operation 414, control is transferred to the first statement of the catch clause. As mentioned above, a catch clause can be used to handle the AIE in a manner similar to exception handling in a synchronized block. In this manner, a method can be constructed so as to operate in a particular manner upon receiving an AIE. After completion of the catch clause, the process 400 ends with operation 418.

In operation 416, the current method is halted and the AIE is sent to the method invoking the current method. In this manner, an AIE can halt method operation and propagate up the call stack to provide asynchronous transfer of control to nested method calls. In operation 418, post process operations are performed. Post process operations can include handling the AIE and other post process operations that will be apparent to those skilled in the art.

As mentioned above, in one aspect, embodiments of the present invention do not interrupt synchronized blocks. Instead, embodiments of the present invention allow the synchronized block to complete operation before allowing the AIE to be further processed. However, it can be difficult to determine from the Java bytecodes when the final operation for the catch clause of the synchronized block has been completed.

Figure 5:
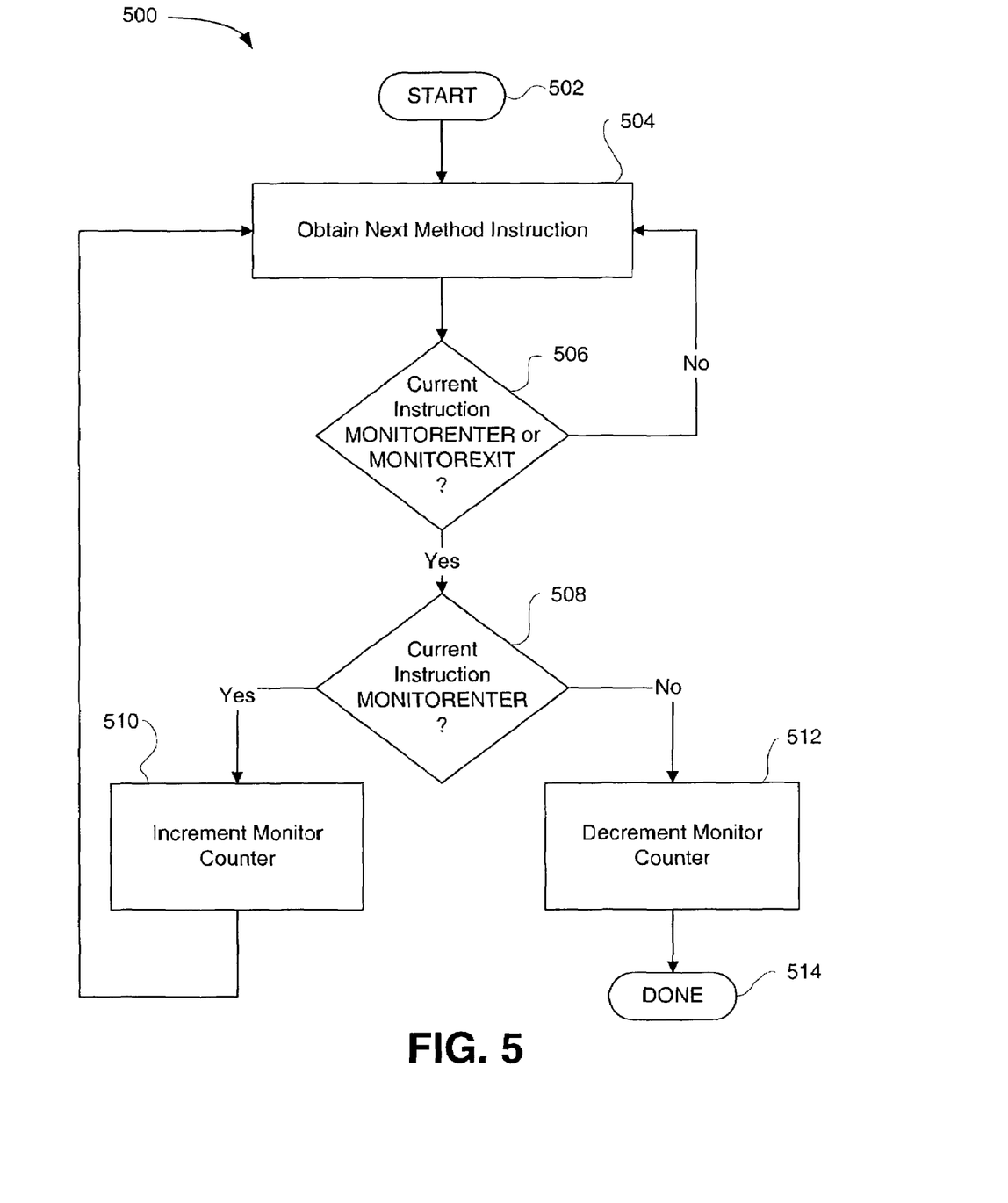
FIG. 5 is a flowchart showing a process for processing a monitor counter for a method, in accordance with an embodiment of the present invention.

To address this issue, embodiments of the present invention utilize a reference counter, referred to as a "monitor counter," to determine when a synchronized code section is being executed and when the synchronized code section is completed. FIG. 5 is a flowchart showing a process 500 for processing a monitor counter for a method, in accordance with an embodiment of the present invention. In an initial operation 502, preprocess operations are performed. Preprocess operations can include defining threads, executing the threads, and other preprocess operations that will be apparent to those skilled in the art.

In operation 504, the next bytecode instruction is obtained. As is normal during program execution, program instructions are obtained one at a time and executed. In this case, the next instruction is obtained to determine the type of the program instruction. In particular, embodiments of the present invention utilize monitor calls as a basis for determining the starting and ending points of synchronized code. One of the strengths of the Java programming language is its support for multithreading at the language level. Much of this support centers on synchronization, the coordination of activities and data access among multiple threads. The mechanism that Java uses to support synchronization is the monitor.

A monitor is like a building that contains one special room that can be occupied by only one thread at a time. The room usually contains some data. From the time a thread enters this room until the time it leaves, it has exclusive access to any data in the room. Entering the monitor building is called "entering the monitor." Entering the special room inside the building is called "acquiring the monitor." Occupying the room is called "owning the monitor," and leaving the room is called "releasing the monitor." Leaving the entire building is called "exiting the monitor."

In addition to being associated with a bit of data, a monitor is associated with one or more bits of code, such as synchronized blocks, referred to as "monitor regions." A monitor region is code that needs to be executed as one indivisible operation with respect to a particular monitor. In other words, one thread executes a monitor region from beginning to end without another thread concurrently executing a monitor region of the same monitor. A monitor enforces this one-thread-at-a-time execution of its monitor regions. Generally, the only way a thread can enter a monitor is by arriving at the beginning of one of the monitor regions associated with that monitor. The only way a thread can move forward and execute the monitor region is by acquiring the monitor.

When a thread arrives at the beginning of a monitor region, it is placed into an entry set for the associated monitor. The entry set is like the front hallway of the monitor building. If no other thread is waiting in the entry set and no other thread currently owns the monitor, the thread acquires the monitor and continues executing the monitor region. When the thread finishes executing the monitor region, it exits (and releases) the monitor. In this manner, monitors can be used to facilitate thread synchronization. As described in greater detail below, embodiments of the present invention utilize monitor calls, which form part of the synchronized block construct, to detect synchronized code sections.

Figure 6:
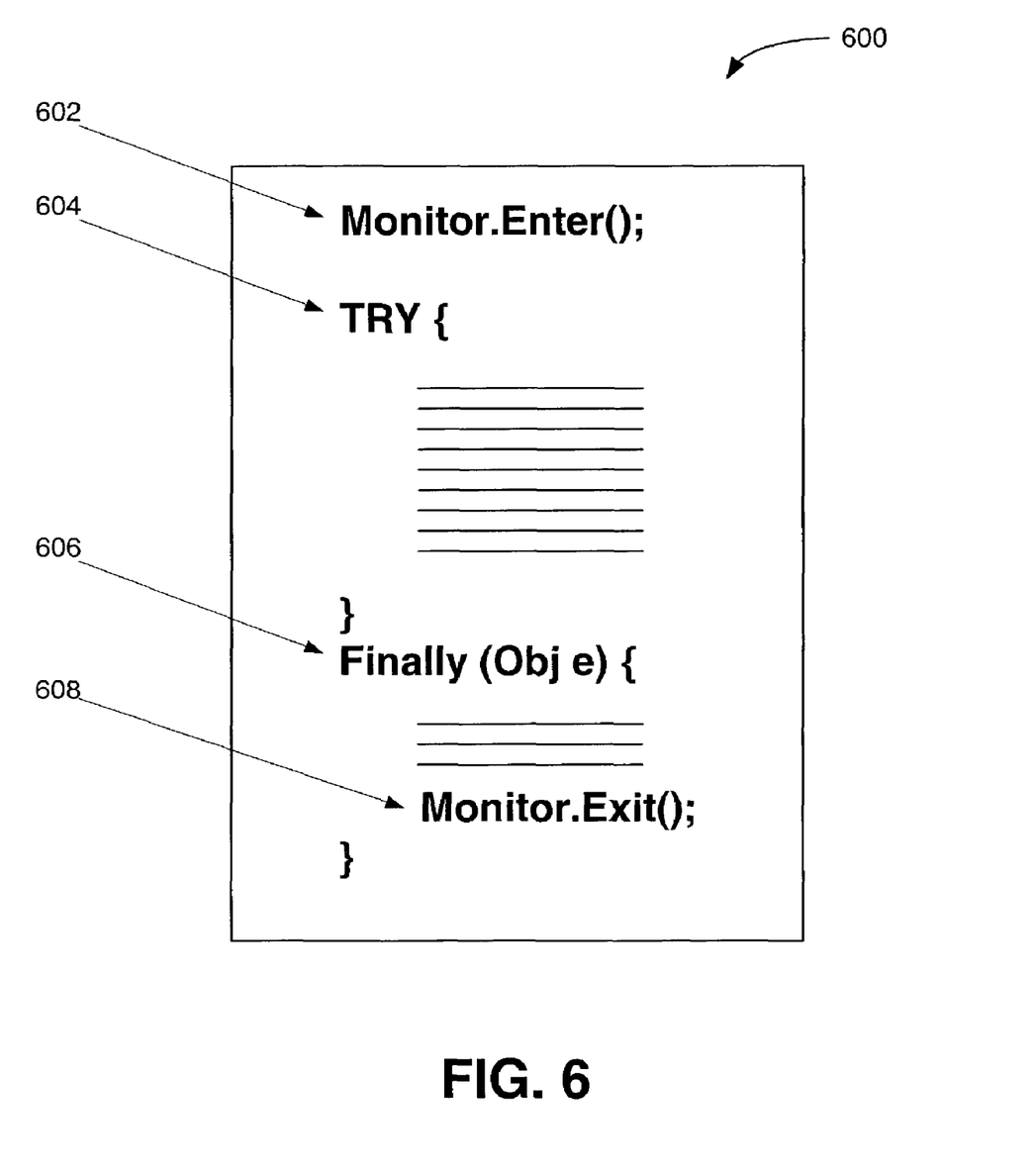
FIG. 6 is diagram showing an exemplary synchronized block code section.

In operation 506, a decision is made as to whether the obtained instruction is a MONITORENTER bytecode instruction or a MONITOREXIT bytecode instruction. Monitor operations generally are paired, thus for every MONITORENTER operation to enter a monitor there exist a corresponding MONITOREXIT call to exit the monitor. FIG. 6 is diagram showing an exemplary synchronized block code section 600. As shown in FIG. 6, the exemplary synchronized block pseudo code 600 includes a MONITORENTER operation 602 (represented the monitor.enter( ) pseudo-method call) followed by a try clause 604, which is followed by a finally clause 606 having a MONITOREXIT operation 608 (represented by the monitor.exit( ) pseudo-method call).

The exemplary synchronized block code 600 illustrates how a synchronized block is implemented. As discussed previously, monitor operations generally are paired, thus the MONITORENTER call 602, used to enter the monitor, corresponds to the MONITOREXIT call 608, used to exit the monitor. By observing when code is executed between these two monitor calls, embodiments of the present invention can determine when a synchronized block is being executed. Referring back to operation 506 of FIG. 5, if the obtained instruction is a MONITORENTER bytecode instruction or a MONITOREXIT bytecode instruction, the process 500 continues with operation 508. Otherwise, the process 500 executes the instruction and obtains the next method instruction in operation 504.

In operation 508, a decision is made as to whether the current instruction is a MONITORENTER bytecode instruction. In operation 506, discussed above, the process branches to another obtain instruction operation 504 unless the current instruction is a MONITORENTER bytecode instruction or a MONITOREXIT bytecode instruction, in which case the process continues to operation 508. Thus, in operation 508, the current instruction is either a MONITORENTER bytecode instruction or a MONITOREXIT bytecode instruction. If the current instruction is a MONITORENTER bytecode instruction, the process branches to operation 510. Otherwise, the current instruction is a MONITOREXIT bytecode instruction, and the process 500 branches to operation 512.

The monitor counter is incremented, in operation 510. As mentioned above, embodiments of the present invention utilize a monitor counter to determine when a method is executing a synchronized block. The monitor counter is a variable that is used to keep track of when a method is executing synchronized code. In particular, the monitor counter initial is set to zero. Thereafter, whenever a MONITORENTER instruction is performed, the monitor counter is incremented, preferably by a discrete amount such as one.

When the current instruction is a MONITOREXIT bytecode instruction, the process 500 branches to operation 512, and the embodiments of the present invention decrement the monitor counter. When the MONITOREXIT instruction is executed, the synchronized code section is completed, thus the embodiments of the present invention decrement the monitor counter to indicate the synchronized block has completed execution. Since a synchronized block generally is preceded by a MONITORENTER call and ended by MONITOREXIT call, a synchronized block is being executed whenever the monitor counter is greater than zero. Thus, the embodiments of the present invention can utilize the monitor counter to determine when synchronized code is being executed, as described next with reference to FIG. 7.

Figure 7:
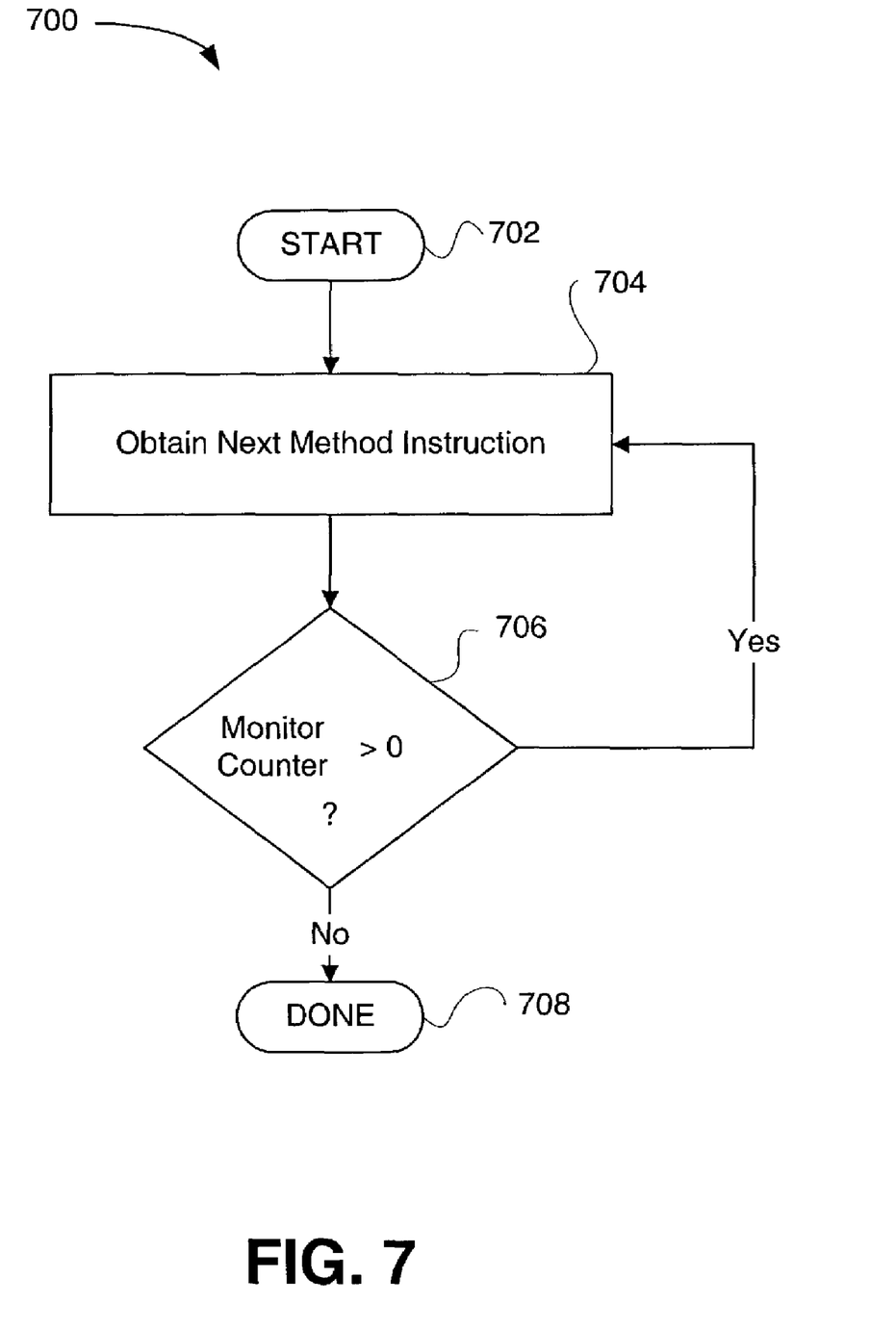
FIG. 7 is a flowchart showing a process for determining when a synchronized block is being executed, in accordance with an embodiment of the present invention.

FIG. 7 is a flowchart showing a process 700 for determining when a synchronized block is being executed, in accordance with an embodiment of the present invention. In an initial operation 702, preprocess operations are performed. Preprocess operations can include incrementing and decrementing the monitor counter, receiving an AIE, and other preprocess operations that will be apparent to those skilled in the art after a careful reading of the present description.

In operation 704, the next bytecode instruction is obtained. As is normal during program execution, program instructions are obtained one at a time and executed. The embodiments of the present invention utilize the monitor counter as a basis for determining the starting and ending points of synchronized code. Since synchronized blocks are bounded by monitor instructions, embodiments of the present invention track the monitor instructions to determine when synchronized blocks are being executed.

In operation 706, a decision is then made as to whether the monitor counter is greater than zero. As mentioned above with reference to FIG. 5, the monitor counter is incremented when a MONITORENTER is performed and decremented whenever a MONITOREXIT is performed. Since a synchronized block generally is preceded by a MONITORENTER and ended by MONITOREXIT, a synchronized block is being executed whenever the monitor counter is greater than zero. Thus, the embodiments of the present invention can utilize the monitor counter to determine when synchronized code is being executed. If the monitor counter is greater than zero, the method is currently executing a synchronized block, and the process 700 branches to another obtain next instruction operation 704. Otherwise, the method is not executing a synchronized block and an AIE can be thrown, in operation 708.

Post process operations are performed in operation 708. Post process operations include throwing an AIE, halting execution of the method, passing the AIE to the method invoking the current method, and other post process operations that will be apparent to those skilled in the art after a careful examination of the teachings of the present disclosure. In this manner, embodiments of the present invention can determine when synchronized code is being executed. As a result, an AIE can be delayed until after the execution of a synchronized block.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A process for providing asynchronous transfer of control, comprising the operations of:

receiving an asynchronous interrupt exception (AIE);

determining whether a method is currently executing synchronized code based on bytecode instructions executing; and asynchronously interrupting the method when the method is executing non-synchronized code;

wherein synchronized code is allowed to complete execution before asynchronously interrupting the method when synchronized code is being executed and a provided marker on a stack frame propagates up the stack frame to a catch clause when the asynchronous interrupt occurs.

2. A process as recited in claim 1, wherein the bytecode instructions are monitor calls.

3. A process as recited in claim 2, wherein the monitor calls include a monitor enter method call, the monitor enter method call allowing a related thread to enter a monitor.

4. A process as recited in claim 3, wherein the monitor calls include a monitor exit method call, the monitor exit method call allowing the related thread to exit the monitor.

5. A process as recited in claim 4, wherein code executed after the monitor enter call and before the monitor exit call is the synchronized code.

6. A process as recited in claim 1, further comprising the operation of determining whether the method allows asynchronous interrupts.

7. A process as recited in claim 6, further comprising the operation of delaying asynchronous interruption until the method completes execution when the method does not allow asynchronous interrupts.

8. A process as recited in claim 7, further comprising the operation of delaying asynchronous interruption until the method invokes a second method that allows asynchronous interrupts, when the method does not allow asynchronous interrupts.

9. A process for providing asynchronous transfer of control, comprising the operations of:

receiving an asynchronous interrupt call;

determining whether a method is currently executing synchronized code based on bytecode instructions executing; and placing an asynchronous interrupt exception (AIE) in a pending state when the method is executing synchronized code and;

asynchronously interrupting the method when the method is executing non-synchronized code, wherein a provided marker on a stack frame propagates up the stack frame to a catch clause in response to the asynchronous interrupt call.

10. A process as recited in claim 9, wherein the bytecode instructions are monitor calls.

11. A process as recited in claim 9, wherein the provided marker is a throws AIE clause of the method.

12. A process as recited in claim 11 wherein, a current pending AIE is determined from a plurality of pending AIE by comparing a nesting method depth of each pending AIE.

* * * * *